J. F. MILLIGAN.
Shovel-Handle.
No. 203,359.        Patented May 7, 1878.
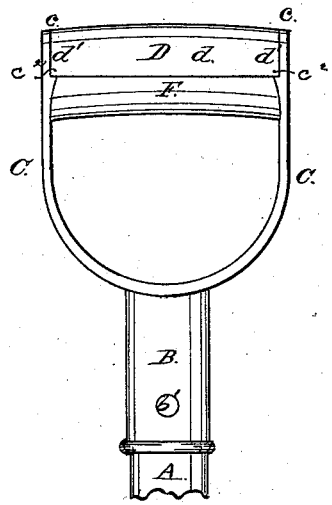
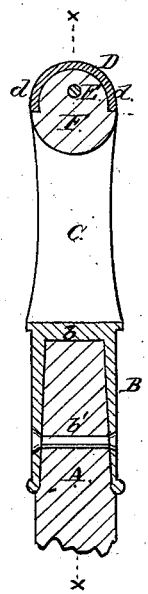
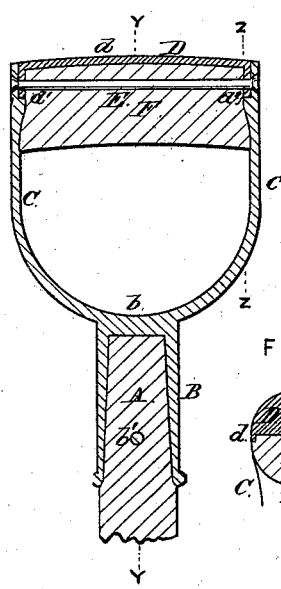
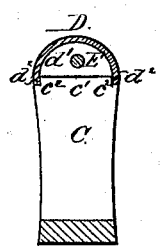
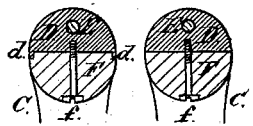

UNITED STATES PATENT OFFICE.

JOHN F. MILLIGAN, OF ST. LOUIS, MISSOURI, ASSIGNOR OF ONE-HALF HIS RIGHT TO EZRA H. LINLEY, OF SAME PLACE.

IMPROVEMENT IN SHOVEL-HANDLES.

Specification forming part of Letters Patent No. 203,359, dated May 7, 1878; application filed April 2, 1878.

*To all whom it may concern:*

Be it known that I, JOHN F. MILLIGAN, of the city of St. Louis and State of Missouri, have invented a certain new and useful Improvement in Handles for Shovels, of which the following is a full, clear, and exact description, reference being had to the accompanying drawings, forming part of this specification.

My improvement consists in the following-described parts, namely: a close-ended socket to fit the round end of the shovel-staff; side pieces recessed at the ends upon the inside to receive the metallic part of the hand-bar, said metallic part consisting of a semi-cylindrical piece with closed ends, through which passes the rivet-rod, that also passes through ends of the side pieces, and through the wooden bar that forms the interior and lower portion of the hand-bar.

As a modification, the metallic part of the hand-bar may be in form of half a solid cylinder, and the wooden part of the same form, as shown in section in Figures 5 and 6.

In the drawings, Fig. 1 is a front view of the handle. Fig. 2 is a section at $x\ x$, Fig. 3. Fig. 3 is a section at $y\ y$, Fig. 2. Fig. 4 is a section at $z\ z$, Fig. 2, with the wooden part of the hand-bar removed. Figs. 5 and 6 show modifications of the hand-bar at line $x\ x$, Fig. 3.

A is a portion of the staff of a shovel-handle. B is the metallic socket made to fit the end of the staff. The socket is closed at the inner end $b$. The socket is preferably made somewhat flaring outwardly, so that the staff may be fitted into it tightly. The wood is held in the socket by a rivet-pin, $b'$.

C C are the side bars, branching from the closed end of the socket, and recessed at the ends, upon the inner side, at $c$, to receive the ends of the metallic part D of the hand-bar. The part D consists of a semi-cylindrical portion, $d$, with end portions $d'$. The ends of the part D rest in the recesses $c$, and the part D is secured to the side bars by a rivet-rod, E, passing through the ends $d'\ d'$ and through the ends of the side bars. This rivet-rod passes, also, through the wooden piece F, which constitutes the inner part of the hand-bar, and which fits the interior of the part D. The corners $d'$ of the part $d$ fit in notches $c^2$ of the shoulder $c^1$, to prevent lateral displacement of the hand-bar.

This improvement adapts the shovel in a peculiar manner for the use of railway-track men, who are in the habit of using the handle to tamp the earth under the ties. When thus used a wooden hand-bar is quickly destroyed.

When my shovel is used for tamping, the strain from the blows comes on the shoulder $c^1$ of the side pieces C and the ends $d'$ of the hand-bar that are in contact with these shoulders, so that the whole strain upon the handle is resisted by the metallic parts.

The wooden block F serves to fill out the inner part of the handle, and furnishes a surface for the grasp of the fingers much preferable to metal. A wooden surface is at all times better than a metallic one for contact with the hand; but, when the hand-bar is made altogether of wood, in a large proportion of cases it becomes split in use, and when used for tamping it is broken.

In my handle the part with which the fingers come in contact is of wood, and only sufficient is covered with metal to protect the bar from injury. Thus all the advantages of a metallic handle are secured, and the wooden surface is retained where most needed.

The socket B is closed at the inner end $b$, to prevent the staff from being forced farther into the socket when the shovel is used as a tamper. Without this closed end the staff would be gradually driven farther and farther into the socket, and it would result in the shortening of the staff and bursting of the socket.

As a modification, the hand-bar may be made as shown in Fig. 5 or Fig. 6, the metallic part D being substantially in form of half a solid cylinder, and the wooden part F in the same form, and the part F attached to that D by screws $f$ or other suitable means.

The part D may have side lips $d\ d$ occupying rabbet-grooves in the part F, as shown in Fig. 5.

I claim as my invention—

The shovel-handle composed of the close-ended and outwardly-flaring socket B, side pieces C C, recessed at $c$, and the hand-bar, composed of the metallic outer piece, whose corners $d'$ fit in notches $c^2$, to prevent lateral displacement, and wooden inner piece F, all substantially as set forth.

JOHN F. MILLIGAN.

In presence of—
SAML. KNIGHT,
GEO. H. KNIGHT.